United States Patent [19]
Birk

[11] Patent Number: 6,079,360
[45] Date of Patent: Jun. 27, 2000

[54] MILKING STALL FOR HOUSING AN ANIMAL TO BE SUBJECTED TO AN ANIMAL-RELATED ACTION

[75] Inventor: Uzi Birk, Huddinge, Sweden

[73] Assignee: Alfa Laval Agri AB, Tumba, Sweden

[21] Appl. No.: 09/214,872

[22] PCT Filed: Jun. 27, 1997

[86] PCT No.: PCT/SE97/01161

§ 371 Date: Jan. 14, 1999

§ 102(e) Date: Jan. 14, 1999

[87] PCT Pub. No.: WO98/04121

PCT Pub. Date: Feb. 5, 1998

[30] Foreign Application Priority Data

Jul. 26, 1996 [SE] Sweden ................................ 9602878-2

[51] Int. Cl.[7] .................................................. A01J 3/00
[52] U.S. Cl. .................... 119/14.09; 119/448; 119/14.1
[58] Field of Search ............................... 119/14.1, 14.09, 119/448, 516, 519, 520

[56] References Cited

U.S. PATENT DOCUMENTS

| | | | |
|---|---|---|---|
| 4,444,020 | 4/1984 | Varga | 119/448 |
| 4,930,446 | 6/1990 | Huisinga | 119/448 |
| 5,707,283 | 1/1998 | Oberreuter et al. | 119/448 |
| 5,746,271 | 5/1998 | DeCosta | 119/448 |
| 5,784,994 | 7/1998 | Van Der Lely | 119/14.1 |

*Primary Examiner*—Peter M. Poon
*Assistant Examiner*—Elizabeth Shaw
*Attorney, Agent, or Firm*—Hovey, Williams, Timmons & Collins

[57] ABSTRACT

A milking stall for housing an animal to be subjected to an animal-related action, comprises an enclosure (2, 3, 4, 17), defining a space (1) and having at least one passage permitting the animal to enter the space, and equipment (5, 8) for the performance of the action regarding the animal being present in the space. In order to attract the animal and make it feel comfortable, there is provided a conditioning device having an air delivery apparatus (18, 18a) adapted to produce an air flow at least to the space (1). Furthermore, it is contemplated that the supply of clean air is of importance for the function of the equipment.

14 Claims, 4 Drawing Sheets

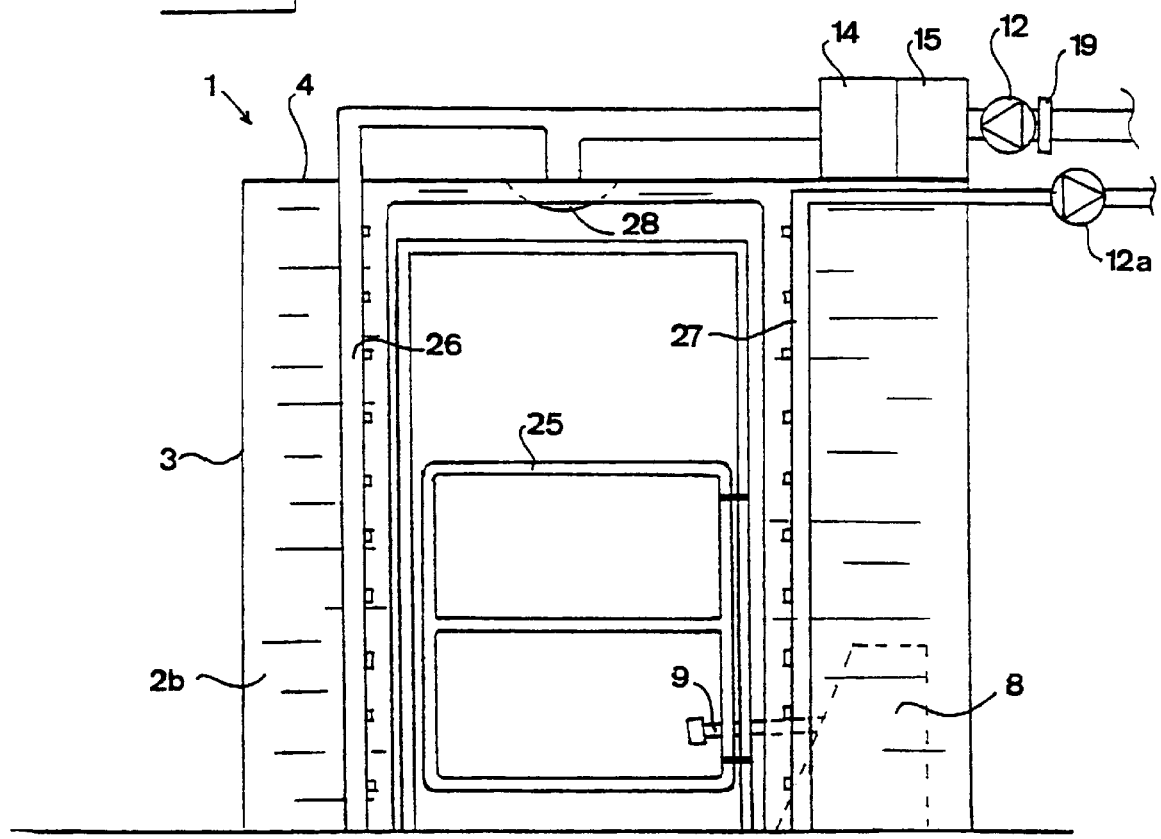

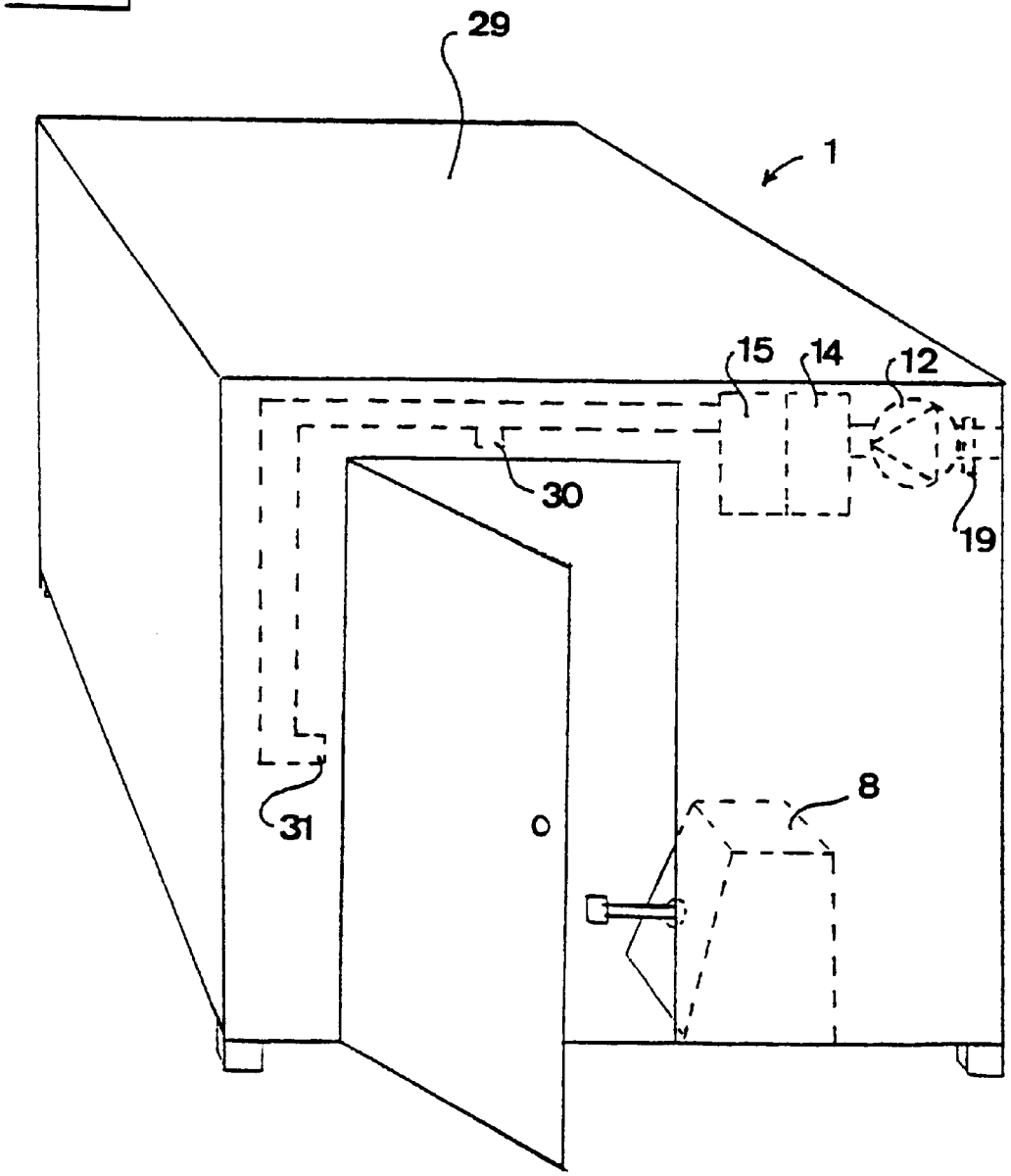

MILKING STALL FOR HOUSING AN ANIMAL TO BE SUBJECTED TO AN ANIMAL-RELATED ACTION

BACKGROUND OF THE INVENTION

1. Field of the Invention

The present invention relates to a stall for housing an animal to be subjected to an animal-related action, comprising enclosure means defining a space and having at least one passage permitting the animal to enter said space, and equipment for the performance of said action regarding the animal being present in said space.

Automatic milking of cows is known from e.g. EP-A-91 892. Automatic milking may take place in one or more automatic milking stalls provided in a barn in which the animals are allowed to walk about freely and find their way individually to the milking stalls. The cows are automatically identified in each stall with the aid of a computer connected to identification means. By means of the computer, in which facts concerning each cow when she was last milked, etc. are stored, a milking robot is activated. The stall also comprises retaining gates which are automatically closed to retain the cow during milking and opened to let the cow leave the stall. Traditionally, cows are milked twice a day. Because of high labour costs it was not interesting to increase the number of milkings per day as long as milking was performed manually. It is however recognized that milking a cow three to four times a day has proved to be of less detriment to her, since the udder is not filled to its maximum between each milking. Such a milking procedure corresponds more closely to the behaviour of the calves and therefore results in healthier cows. As a side effect, however, it is possible to increase the total milk production from one cow by 15–25% by increasing the number of milkings per day. By means of automatic milking machines it is not only possible, but would also be economically interesting to milk the cows more often than twice a day, since the labour costs are not any longer critical. In this case it is rather the high investment cost which is the limiting factor. Therefore, in order to reach a high utilization of the capacity of such automatic milking machines and in order to reach such a high milking frequency by a reasonable number of automatic milking stations, it is desirable or even necessary to enable the cow to develop a trust in the milking station and the automatic milking machine. Only then she will voluntarily and frequently enter the milking station. In view thereof it is of course very important that she does not associate the milking station with anything which hurts or is disagreeable to her.

The weekly magazine BOERDERIJ No. 15 from Jan. 12, 1988 describes a transportable container accommodating an automatic milking system for milking an animal. Because the container can be closed completely, climate control is necessary for keeping the automatic milking system frost-free.

However, the cows and other animals also must be subjected to other animal-related actions than milking, for example medical treatment, teat and body cleaning, insemination, automatic feed supply, etc. Also in these cases it is important that the place where such animal-related actions are performed is not associated with disagreeable experiences. It is believed that the performance of such animal-related actions is easier and thus more effective when the animal feels comfortable and safe.

Another problem is that the atmosphere in a barn housing many animals walking about freely is of poor quality. Such an atmosphere may contain many problematic substances, such as ammonium, chlorine, and other corrosive and aggressive gases, moisture, etc. Such substances may reduce the reliability of the sophisticated mechanical and electronic equipment necessary for the performance of a more or less automatic milking procedure. Moreover, they may deteriorate the quality of the milk and influence the health and the comfort of the animals negatively. Moreover, the temperature in such a barn housing many animals is in many cases too high, which is uncomfortable for the animals and may deteriorate the quality of the milk.

SUMMARY OF THE INVENTION

The object of the present invention is to overcome the problems mentioned above and provide an improved apparatus for housing an animal to be subjected to an animal-related action. Moreover, the apparatus should offer the animal a place which is attractive and comfortable to the animal, in order to facilitate the performance of said action.

This object is obtained by the apparatus initially defined, which is characterized in that a conditioning device having air delivery means adapted to produce an air flow at least to said space. By means of such a conditioning device it is possible to provide a climate in said space which is comfortable to the animal and thus may attract it to enter said space. Moreover, the animal being present in said space will behave in a more calm and confident manner, thereby facilitating the performance of said action. An animal feeling safe may stay still during for example the attachment of the teatcups by means of an automatic handling device, which might be a precondition for the success of such attachment.

According to one embodiment of the invention, the equipment comprises an electronic control device provided to control the performance of said action and the conditioning device may comprise conduit means provided to supply an air flow to said control device. Preferably, the electronic control device comprises a housing and the conditioning device is adapted to supply air into said housing and to produce a pressure therein which is higher than the pressure outside the housing. Thereby, the surrounding atmosphere is effectively prevented from reaching sensitive electronic components within the control device.

According to another embodiment of the invention, the air delivery means is adapted to provide a region of essentially clean air in said space. Thereby, it is possible to improve the quality of the atmosphere in the treatment space. This may be very important for the equipment, such as a milking machine, and in case of milking for the quality of the milk. Of course, a good atmosphere is also positive to the health and comfort of the animal. Preferably, the conditioning device may comprise conduit means connecting the air delivery means with the ambient outside atmosphere and adapted to provide fresh air to the air delivery means and said space.

According to another embodiment of the invention, the air delivery means comprises air outlet means adapted to direct the air flow towards a region of said space where the animal is to be present. It is believed that such a direct air flow, e.g. in the form of a smooth stream of air, directed towards the animal is experienced as particularly comfortable to the animal.

According to another embodiment of the invention, the conditioning device comprises temperature regulating means adapted to regulate the temperature of the air delivered to a level being comfortable for the animal. Moreover, the conditioning device may comprise humidity regulating means adapted to regulate the humidity of the air delivered to a level being comfortable for the animal. Furthermore, the stall may comprise a fresh water supply provided in said space and the conditioning device may comprise a temperature regulating device provided to regulate the temperature of said fresh water supplied. Thus, the drinking water for the animal may have an appropriate temperature.

According to another embodiment of the invention the enclosure means is adapted to prevent an inward gas flow of the atmosphere outside said space. In this manner, the problematic substances mentioned above may be kept outside said space and thus the equipment may be protected. Thereby, said enclosure means may comprise air outlet means adapted to form an air curtain preventing an inward gas flow of the atmosphere outside said space. Moreover, said enclosure means may comprise air inlet means provided essentially opposite to said air outlet means of said enclosure means and adapted to receive at least a part of the air from said air outlet means. Furthermore, said enclosure means may comprise wall means adapted to prevent an inward gas flow of the atmosphere outside said space. In this manner, any inward gas flow of a poor quality atmosphere may be prevented effectively.

According to a further embodiment of the invention, the equipment may comprise an automatic handling device for the performance of said action by manipulating animal-related means. Such automatic handling devices may comprise many different parts and elements being sensitive to a corrosive and aggressive atmosphere. Therefore, the provision of the fresh air zone around the equipment and said animal-related means may improve the reliability thereof. Furthermore, the animal-related means may comprise at least one teatcup to be attached by said automatic handling device to a teat of the animal being present in the stall. Preferably, the air delivery means may comprise air outlet means disposed in the proximity of the teatcups at least during said teatcup attachment. Thereby, the surrounding atmosphere is effectively prevented from reaching the milk.

According to another embodiment of the invention, said enclosure means comprises a transportable container.

BRIEF DESCRIPTION OF THE DRAWINGS

The present invention will now be explained more closely by the description of different embodiments thereof and with reference to the drawings.

FIG. 3 shows a side view of a third embodiment of the apparatus according to the invention.

FIG. 4 shows a perspective view of a fourth embodiment of the apparatus according to the invention.

DETAILED DESCRIPTION OF DIFFERENT EMBODIMENTS

Figure 1:
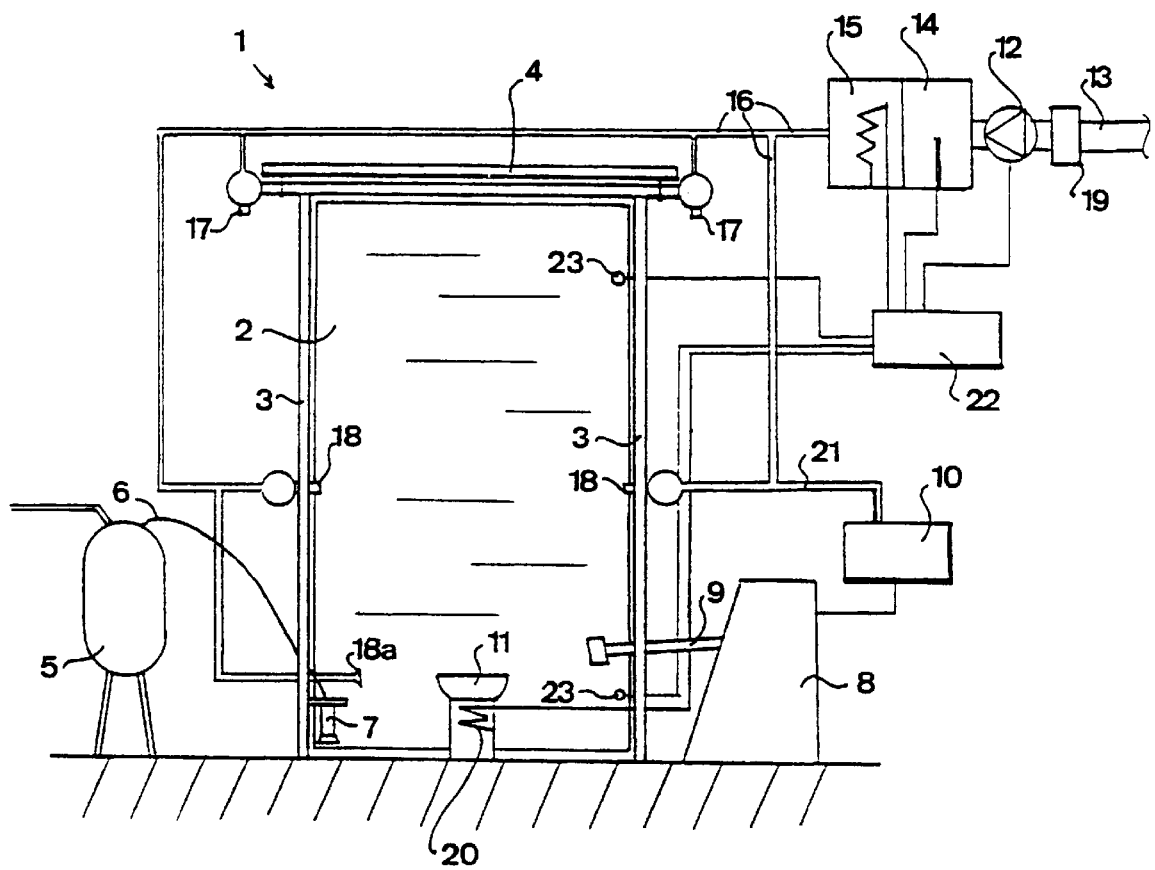
FIG. 1 shows a side view of a first embodiment of the apparatus according to the invention.

FIG. 1 schematically shows a stall according to a first embodiment of the invention. The stall comprises a milking stall 1 for housing a cow to be milked, which may be provided in a barn (not shown) housing many animals walking about freely. The milking stall 1 comprises enclosure means, which in the first embodiment comprises a front wall 2 and side grids 3, schematically indicated. Any one of the side grids 3 may comprises an exit gate (not shown) and the rear wall comprises an inlet gate (not shown).

Furthermore, the milking stall 1 comprises a ceiling wall 4 provided on top of it. In connection to the milking stall 1, there is provided a milking machine represented by a receptacle container 5, a milk conduit 6 and a teatcup 7 to be attached to a teat of a cow being present in the milking stall 1. For said attachment, there is provided an automatic handling device 8 having a robot arm 9 and an electronic control device 10. By means of the control device 10, the robot arm 9 may be controlled to grip the teatcup 7 and attach it to a teat of the cow. The electronic control device 10 is comprised in a housing, schematically disclosed as a box 10. At the front end of the milking stall 1, there is provided a water supply 11 offering water to the animal being present in the milking stall 1.

In order to provide a comfortable and pleasant atmosphere in the milking stall 1, there is provided a conditioning device having air delivery means to produce an air flow to the milking stall. The air delivery means comprises an air pump 12 having an inlet conduit 13 connected to the ambient atmosphere outside the barn. The outlet side of the air pump 12 is connected to a humidity regulating device 14 and a temperature regulating device 15. From there, the air is delivered to different air outlet means by a suitable conduit system 16. First air outlet means 17 are provided on each side of the milking stall 1 to provide an air curtain defining a respective side surface and thereby preventing a gas flow into the milking stall 1 from the barn. Such an air curtain is advantageous since it does not make the cow feel confined in the milking stall 1. Second air outlet means 18 are provided on each side of the milking stall 1 to provide an air flow in the form of a smooth air stream directed towards the cow being present in the milking stall 1. Such an air stream is comfortable to the cow and therefore she will be relaxed and stand still in the milking stall, thereby facilitating the attachment of the teatcups 7. Moreover, such an air stream may activate the production of oxytoxin being important to the milk stimulation reflex and the let down of milk. Although the second air outlet means 18 are provided along a horizontal line on each side in the first embodiment, such air outlet means may be provided in many different positions. For example, there may be provided second air outlet means 18a in the lower region of the milking stall 1, which may be adapted to provide a smooth air stream towards the cow and a zone of fresh air in the proximity of the teatcups 7. Thereby, the air, which may be sucked into the milking system of the milking machine at least during the attachment of the teatcups 7 to the teats, will be of a good quality. In order to improve the air quality of the air delivered and thus to provide a flow of clean air, the conduit 13 may comprise a filter indicated at 19. Moreover, the conditioning device comprises a temperature regulating device 20 provided in the water supply 11, preferably in the form of a heating device. Thereby, the fresh water may be supplied with an appropriate temperature, preferably between about 15 and 20° C., for example 17° C. Furthermore, the conditioning device comprises a conduit 21 connected to the conduit system 16 and the box 10 of the electronic control device. Thereby, conditioning air may be supplied to the box 10, preferably to obtain a slight overpressure therein, to provide an atmosphere within the box 10 which is dry and clean and within a desired temperature range, thereby securing a reliable function of the electronic control device. Alternatively, the electronic control device may be accommodated within the enclosure means.

In order to be able to control the climate in the milking stall 1, there is provided a control unit 22 which is connected to two sensor 23 provided in the milking stall 1.

It should be noted that more or less sensors 23 than two may be provided. The sensors 23 may be adapted to sense the temperature and the humidity within the milking stall 1 and by means of the control unit 22 the temperature and the humidity of the air delivered may be controlled to be adapted to the seasons and to the comfort of the animal. Thus, the temperature regulating device 15 must be capable of both cooling and heating the air delivered. In the same manner, the humidity regulating device 14 must be capable of both drying and humidifying the air delivered.

The inlet side of the milking stall 1 according to the first embodiment does not comprise any means hindering an inward gas flow. Therefore, it is important that the capacity of the air pump 12 is such that a slight overpressure may be provided within the milking stall 1 and in this manner no ambient atmosphere from the barn will enter the milking stall 1.

Figure 2:
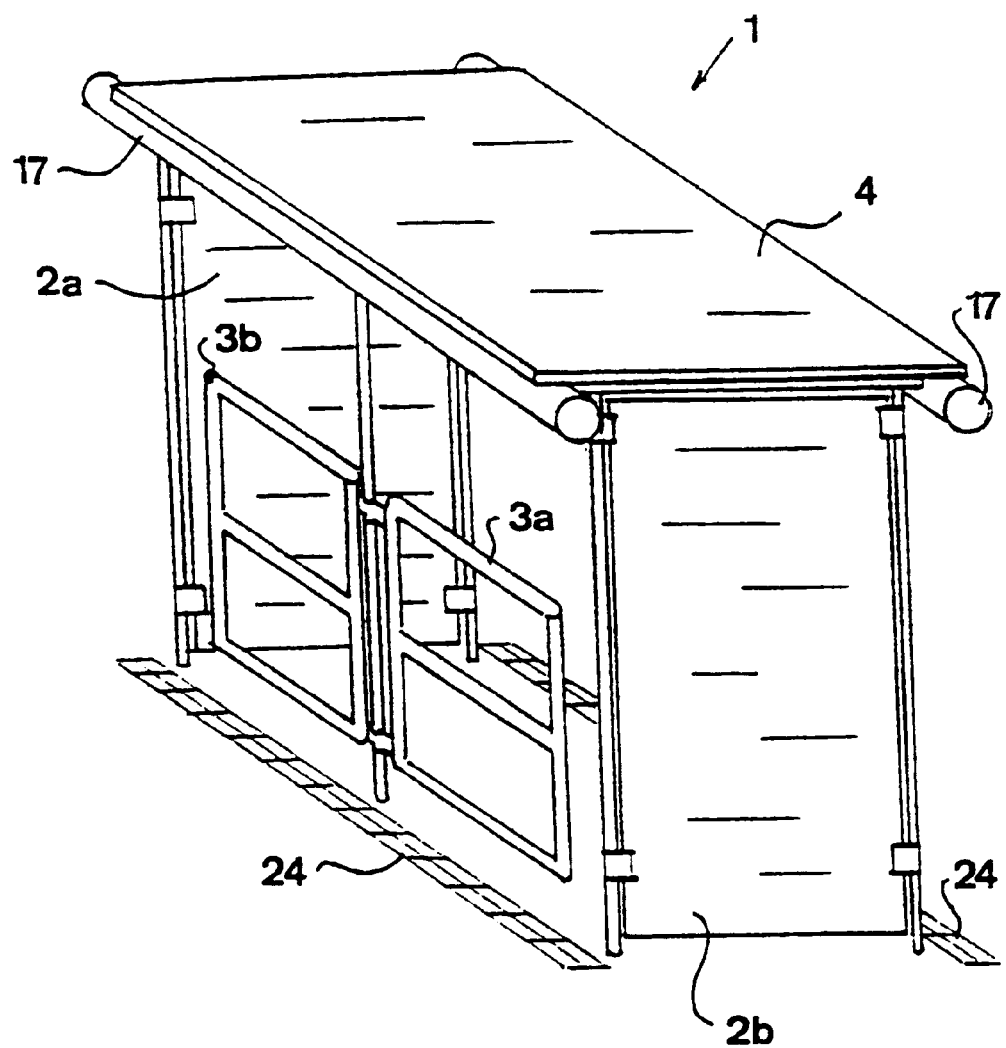
FIG. 2 shows a perspective view of a second embodiment of the apparatus according to the invention.

FIG. 2 shows a second embodiment of the present invention. It should be noted that elements of the apparatus according to the invention having a corresponding function are provided with the same reference signs in the different embodiments disclosed. The milking stall 1 disclosed in FIG. 2 is slightly modified in comparison with the milking stall 1 of FIG. 1. Thus, an inlet gate 3a and an exit gate 3b are provided at one side of the milking stall 1. The front wall 2a and a rear wall 2b enclose the interior of the milking stall 1 together with air curtains provided by means of first air outlet means 17 and air inlet means 24 provided in the floor essentially opposite to the air outlet means 17 and adapted to receive at least a part of the air from the outlet means 17 in order to improve the functioning of the air curtain. It should be noted that FIG. 2 merely shows the structure of the enclosure means; the conditioning device and the equipment have been left out in order to facilitate the understanding of the figure.

FIG. 3 shows a third embodiment of the present invention. The milking stall 1 is enclosed by a ceiling wall 4, side walls 3 and partly covering front and rear walls 2b (the front wall not disclosed). Thus, the front wall and the rear wall 2b may have an opening comprising a front exit gate (not shown) and a rear entrance gate 25, respectively, of the milking stall 1. In order to provide an essentially completely enclosed atmosphere within the milking stall 1, air curtains may be provided just outside the front exit gate and the rear entrance gate 25, respectively. To this end, the conditioning device comprises third air outlet means 26 comprising a vertical channel on one side of the entrance gate 25 and the exit gate, respectively, and air inlet means 27 comprising a vertical channel on the other side of the entrance gate 25 and the exit gate, respectively. Thus, at least a part of the air from the outlet means 26 is sucked through the inlet means 27 by means of a further air pump 12a to an outlet. Alternatively, the air entering the air inlet means 27 may be recirculated to the conduit 13 by means of the air pump 12. Moreover, the conditioning device may comprise a fourth outlet means 28 for the supply of fresh air to the interior of the milking stall 1, preferably such that a slight overpressure is provided within the milking stall 1. The walls 2b, 3 and 4 are defining an space or a space enclosing the milking stall 1, the milking machine 5, the automatic handling device 8 and the automatic control device. Thus, all parts of the milking stall 1 and all equipment therein may be effectively protected against the ambient barn atmosphere. It should be noted that the walls 2a, 2b, 3 and 4 disclosed in the different embodiments may be made of a transparent material.

FIG. 4 shows a fourth embodiment of the present invention. The milking stall 1 and all equipment, such as the automatic handling device 8, the electronic control device, the conditioning device, is enclosed in the enclosure means in the form of a transportable container 29. The conditioning device as disclosed comprises the air pump 12, the temperature regulating device 15, the humidity regulating device 14, and a number of air outlet means, exemplified at 30 and 31. The transportable container 29, which is of a standard size, may be liftable to and transportable on a wagon, or provided with wheels (not shown) in order to be towed.

The present invention is not limited to the embodiments disclosed herein but may be modified within the scope of the following claims. Although the present invention has been explained in connection with a milking stall it should be understood that the inventive idea also may be applied to other animal-related actions, such as medical treatment, teat or body cleaning, insemination, automatic feed supply, etc. Thereby, the equipment also may comprise other animal-related means than teatcups, such as teat cleaning means, brush means, inspection means, tools for medical treatment or insemination. It should be pointed out that these animal-related means are to be manipulated by the automatic handling device 8. Moreover, although a space or a milking stall have been described for one single animal, it should be understood that the stall also may include more than one animal simultaneously. It should also be noted that the different components disclosed in the first, the second and the third embodiment may be combined with each other in other combinations than those disclosed.

What is claimed is:

1. A milking stall for housing an animal to be subjected to an animal related action, comprising:

enclosure means defining a space, having at least one passage permitting the animal to enter said space, and adapted to prevent an inward gas flow of the atmosphere outside said space and equipment including an automatic handling device for the performance of said action by manipulating at least one teatcup to be attached by said automatic handling device to a teat of the animal being present in the space; and a conditioning device having air delivery means adapted to produce an air flow at least to said space.

2. A stall according to claim 1, wherein the equipment comprises an electronic control device provided to control the performance of said action and that the conditioning device comprises conduit means provided to supply an air flow to said control device.

3. A stall according to claim 2, wherein the electronic control device comprises a housing and that the conditioning device furthermore is adapted to supply air into said housing and to produce a pressure therein which is higher than the pressure outside the housing.

4. A stall according to any one of claims 1, wherein the air delivery means is adapted to provide a region of essentially clean air in said space.

5. A stall according to claim 1, wherein the conditioning device comprises conduit means connecting the air delivery means with the ambient outside atmosphere and adapted to provide fresh air to the air delivery means and said space.

6. A stall according to claim 1, wherein the air delivery means comprises air outlet means adapted to direct the air flow towards a region of said space where the animal is to be present.

7. A stall according to claim 1, wherein the conditioning device comprises temperature regulating means adapted to regulate the temperature of the air delivered to a level being comfortable for the animal.

8. A stall according to claim 1, wherein the conditioning device comprises humidity regulating means adapted to regulate the humidity of the air delivered to a level being comfortable for the animal.

9. A stall according to claim 1, wherein the stall comprises a fresh water supply provided in said space and that the conditioning device comprises a temperature regulating device provided to regulate the temperature of said fresh water supplied.

10. A stall according to claim 1, wherein said enclosure means comprises air outlet means directed to form an air curtain preventing an inward gas flow of atmosphere outside said space.

11. A stall according to claim 10, wherein said enclosure means comprises air inlet means provided essentially opposite to said air outlet means of said enclosure means and adapted to receive at least a part of the air from said air outlet means.

12. A stall according to claim 1, wherein said enclosure means comprises wall means adapted to prevent an inward gas flow of the atmosphere outside said space.

13. A stall according to claim 1, wherein air delivery means comprises air outlet means disposed in the proximity of the teatcup at least during said teatcup attachment.

14. A stall according to claim 1, wherein said enclosure means comprises a transponder container.

* * * * *